United States Patent Office 2,744,841
Patented May 8, 1956

2,744,841

REMOVING POLYETHYLENE FROM METAL SURFACES

Frank Cassis, Munster, Ind., and Charles R. Greene, El Cerrito, Calif., assignors to Standard Oil Company, Chicago, Ill., a corporation of Indiana No Drawing. Application May 20, 1955, Serial No. 510,051

2 Claims. (Cl. 134—7)

This invention relates to a method for removing polyethylene resin from metal surfaces. More particularly, it pertains to a method of cleaning metal equipment which has come in contact with molten polyethylene resin.

The formation of polyethylene resin into particulate shapes and forms by extrusion, injection molding and other methods is involved in the majority of the applications of this polymer. Because of the adhesiveness of this material to metals, the cleaning of equipment poses a severe problem. One of the methods commonly employed for removing polyethylene resin from metal surfaces is to contact the surface with boiling xylene solvent. Another method is scouring the metal surface with copper wool or the like. Both of these methods are relatively expensive and time consuming and equipment such as extruders and molds must be taken apart for scouring or immersing in a solvent.

It is an object of this invention to provide a method of removing adherent polyethylene from metal surfaces. It is a further object to provide a method of cleaning polyethylene extrusion and/or molding equipment.

Another problem which has been encountered in extruding or molding polyethylene is removing the last traces of one color of polyethylene material before handling material of another color. To avoid contamination of one color by the other, the preceding material had to be cleaned out using methods as pointed out hereinbefore or, as was commonly done, the first of such materials was flushed out with the second. This was rather time consuming and quite wasteful of the polyethylene material.

The same type of problem is also encountered in laboratory testing or plant control work wherein physical properties of polyethylene resin are being studied. After handling a sample of polyethylene resin, it must be completely removed from the test equipment before proceeding to carry out test operations on a following sample.

It is accordingly a further object of this invention to provide a method of completely removing one type or color of polyethylene resin from metal surfaces before handling a different type or color of polyethylene resin.

A method for accomplishing the objects as hereinbefore pointed out comprises contacting the polyethylene material with pentaerythritol in the temperature range above the softening point of the polyethylene material and below the melting point of the pentaerythritol and preferably in the range of from about 250° F. to about 450° F., and withdrawing the polyethylene and pentaerythritol from the metal surface.

Without limiting the invention to any theory, and merely for the purpose of facilitating comprehension of the above indicated method, the following mechanism is proposed whereby adherent polyethylene material is removed from metal surfaces by contact with pentaerythritol. By physical inspection it appears that the solid pentaerythritol coats the molten polyethylene material thereby precluding further contact of the polyethylene material with the metal surfaces. Inasmuch as the pentaerythritol does not in itself adhere to metal, the withdrawal of the pentaerythritol and coated polyethylene from the metal surfaces is easily accomplished.

The following example is given as an illustrative, and not limitative, embodiment of our invention. In this example the polyethylene resin used is typical of the commercially available polyethylene materials and may be purchased from the E. I. du Pont de Nemours & Co., Inc., as "Alathon" 2 polyethylene resin. The material is a waxy, white translucent solid. It has a molecular weight of about 17,000 and a softening point of about 210° F.

Polyethylene resin in the form of ⅛ inch pellets was passed through a one-inch Archimedean screw type extruder at 325° F. with a screw speed of 30 R. P. M. The extruder was equipped with a ¼ inch tubing die. As the last polyethylene pellets disappeared through the feed cavity, granular pentaerythritol was introduced and the feeding continued until the material emerging from the die was powdered pentaerythritol.

The extruder was then dismantled and the extruder barrel blown out with compressed air. The surface was bright and shiny, and no polyethylene resin was found on the barrel or screw of the extruder or on the die.

As an example of how the polyethylene resins adheres to the metal surfaces with which it comes in contact when in a molten state, the following observation was made. Polyethylene resin, identical to that employed in the preceding example, was passed through the same screw type extruder at 325° F. with a screw speed of 30 R. P. M. The extruder was operated until material stopped emerging from the die.

Upon dismantling the extruder, it was found that substantial amounts of polyethylene resin were tightly bonded to the barrel, the screw and portions of the die. This material was removed by scouring with copper wool, and only then with great difficulty. As is readily apparent, this method for removing undesirable polyethylene resin from the metal surfaces of the screw type extruder is very time consuming.

It has also been noted that when the extruder is cleaned by displacement of one sample of polyethylene with a second sample, the elapsed time before the last traces of the first sample emerge from the extruder die is significantly greater than the elapsed time in cleaning the extruder using pentaerythritol as hereinbefore described. The quantity of polyethylene resin used in such a purging type cleaning method is particularly undesirable when only relatively small samples of material are available for testing or plant control purposes.

The use of pentaerythritol for removing adherent polyethylene may be employed in devices other than extruders. For instance, it may be used for cleaning injection molding devices, extrusion coating devices, laminating devices, blow molding devices and other equipment used for forming polyethylene resin into particulate shapes and forms. An injection molding machine may be cleaned by charging pentaerythritol in place of polyethylene resin, at temperatures above the softening point of the polyethylene, after the last of such injection moldings with polyethylene has been carried out. Undesirable polyethylene resin is removed from the mold and injecting cylinder and piston in this manner and the device made ready for an operation employing other resins.

The above described method for removing adherent polyethylene resin from metal surfaces by contacting with pentaerythritol may be carried out at a temperature above the softening point of the polyethylene material and below the melting point of the pentaerythritol. It is understood that the softening point of polyethylene resin is the temperature at which the material becomes completely amorphous as determined by heating a thin piece of the polymer between glass holders on a Fisher-Johns heating block while slowly raising the temperature and observing the polymer through polarized glass to determine the temperature at which light from a polarized source ceases to be reflected by the sample. This is essentially the temperature at which the sample becomes completely amorphous. At temperatures below the softening point of the polyethylene resin, the solid pentaerythritol is unable to form a coating on the polyethylene material and preclude its adherence to the metal surfaces. Furthermore, at temperatures below the softening point of the polyethylene resin, devices such as extruders are generally inoperable and contact of the polyethylene resin and pentaerythritol is thereby unattainable. The upper temperature for carrying out the herein disclosed process is limited by the melting point of the pentaerythritol, which is about 500° F. It is inadvisable, however, to exceed a temperature much greater than about 450° F. due to the instability of the polyethylene resins at such temperatures.

In referring to molten polyethylene herein, it is considered that at temperatures above the softening point temperature the resin is in a molten state. It is recognized, of course, that polyethylene resin does not form a liquid at its softening point but, rather, passes into a relatively mobile state, characteristic of thermoplastic materials of this type.

It is contemplated that the pentaerythritol used for the hereinbefore described purposes may be mixed or compounded with other materials. For instance, the pentaerythritol may be compounded with dioctyl phthalate and used in the above described manner for removing adherent polyethylene resin from metal surfaces. It is further contemplated that those skilled in the art may adapt the herein described method of removing polyethylene resin from metal surfaces to the various devices and machines employed in handling molten polyethylene resin.

We claim:

1. The method of removing polyethylene resin from metal surfaces comprising contacting said polyethylene resin on said surface with pentaerythritol at a temperature above the softening point of said polyethylene and below the melting point of said pentaerythritol and withdrawing said polyethylene and said pentaerythritol from said metal surface.

2. The method of removing polyethylene resin from metal surfaces comprising contacting said polyethylene resin on said surface with pentaerythritol at a temperature above about 250° F. and below about 450° F. and withdrawing said polyethylene and said pentaerythritol from said metal surface.

No references cited.